Patented June 5, 1934

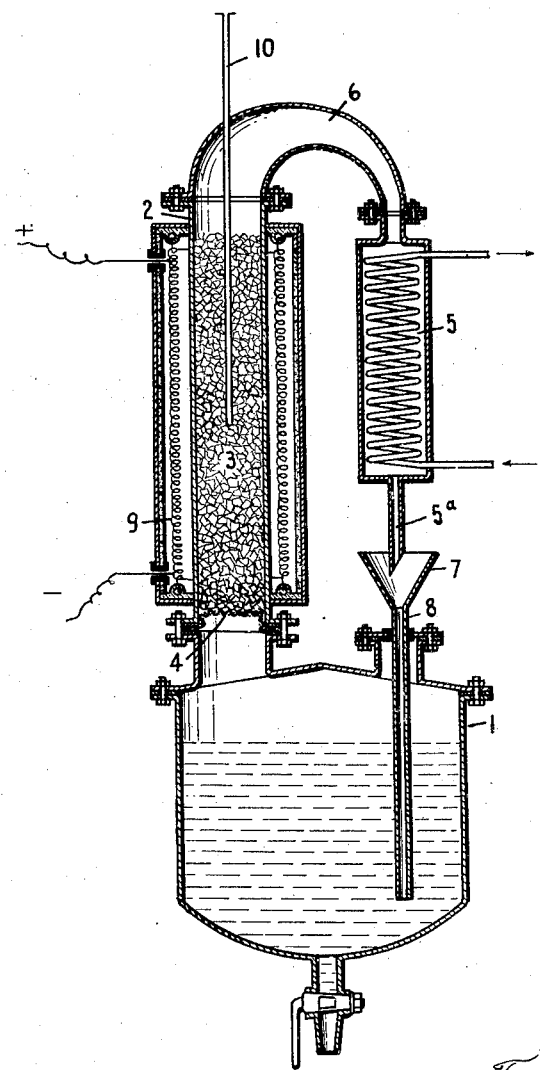

1,961,834

UNITED STATES PATENT OFFICE 1,961,834

PROCESS FOR THE MANUFACTURE OF PHENOLS FROM HALOGENATED HYDROCARBONS

Friedrich A. Steingroever, Dresden, and Rudolf Zellmann, Radebeul, Germany, assignors to Chemische Fabrik von Heyden A. G., Radebeul, near Dresden, Germany, a corporation of Germany Application October 24, 1931, Serial No. 570,832
In Germany October 25, 1930

6 Claims. (Cl. 260—154)

This invention relates to the manufacture of phenols from halogenated hydrocarbons and it particularly relates to the manufacture of phenol or carbolic acid ($C_6H_5.OH$) from halogenated benzol. The manufacture of phenols, such as carbolic acid, from halogenated hydrocarbons, for instance, such as chlorbenzol, by acting on the same with steam, or water vapor, at an elevated temperature and in the presence of a catalyzer, has repeatedly been described.

According to the publications all the successful processes, accomplishing a yield of from 70–90% of phenol, utilized silica-gel as a catalyzer.

A great number of substances were suggested as catalyzers by the prior art. So Meyer & Bergins applied aluminum oxide, magnesium oxide, iron oxide, thorium oxide. Upon investigation of the efficiency of aforesaid compounds for the purposes of the present application we found that with aluminum oxide, which Meyer & Bergins pointed out as the most suitable catalyzer, only yields of about 20% could be obtained.

Titanium oxide, thorium oxide, zirconium oxide and tungstic oxide were suggested by Lyman Chalkley (Journ. Am. Chem. Society, 51, pages 2489—90), though their suggestion has not led to a commercial success.

We have now found that we may obtain practically theoretical yields of phenol if we use as catalyzers one of the oxides or hydroxides of the metals mentioned in aforesaid groups, particularly if we bring these catalyzers into their most active form.

This activation may be effected by adding to these aforesaid metal compounds other metals, and metal compounds, in lesser or greater quantities. For instance, the effect of the ordinary aluminum oxide may be increased if it is applied in the form of its hydroxide. On the other side we obtain particularly favorable results with zinc oxide which was obtained by carefully burning up metallic zinc. Furthermore, we found it advantageous to add metal salts, such as zinc phosphate, to aforesaid catalyzers. Also a small addition of copper phosphate or the salt of another metal increases the catalytic effect. Very often the metal, of which the apparatus is made, has a favorable effect. So, for instance, the catalytic process proceeds in many cases more favorably in an apparatus made of copper than in one made of quartz. Mixtures of such catalytically active substances are of high effect.

The mutual adjustment of the temperature in relation to the velocity of the steam in the catalyzer chamber as well as the proportion of water to hydrocarbon halide in the mixture of the reaction gases are important.

As compared with catalyzers applied at present in the art, the catalyzers of our process, as described above, are of very low price.

Example

Upon 100 parts of aluminum hydroxide, as obtainable on the market, 2 parts of copper phosphate are precipitated by acting on copper-chloride, with which the aluminum hydroxide was saturated, with an equivalent amount of di-ammonium phosphate, the free acid having been neutralized with ammonia. The green mass, which is thus obtained, may be formed into any suitable form, for instance, by preparing it into tablets of cylindrical shape, or into balls, in which case we found it advantageous to embody some freshly precipitated aluminum hydroxide into the mass. To dehydrate the shaped catalyzer we heat the same very carefully up to 450° whereupon it is in proper form to act in the transformation of chlorbenzol to phenol at a temperature of 350° and above. The obtained yields of phenol are most satisfactory.

Instead of aluminum oxide and copper phosphate we may apply a great variety of other metal compounds, such as, for instance, zinc oxide, zinc phosphate, nickel compounds, tungsten compounds, cadmium compounds etc. The proportions of the parts in which the ingredients of the catalyzer can be mixed, may vary within wide limits.

For the better understanding of our new invention we are going to describe how we may operate to put the same into effect and as an example we choose to describe the said operation in connection with the transformation of chlorbenzol into phenol, emphasizing, however, that the operation proceeds equally well with chlortoluol, or other halogen compounds of the homologues of benzol.

For the illustration of the various steps of the process, reference is had to the accompanying drawing which in a rather diagrammatic way shows a vertical sectional view of an apparatus which we found very suitable for carrying our invention into effect.

In a general way we may say that the chlorbenzol is vaporized in a still and that these vapors, mixed with water vapor, are conducted over a catalyst prepared as described above, which is brought into a suitable shape and is heated to a temperature of about 500° C. From the off-going vapors the phenol and the hydrochloric acid gas are separated by having them absorbed by an alkali-metal hydroxide, while undecomposed chlorbenzol is condensed and returned to the process. After all the chlor-benzol has been transformed, the phenol is recovered in any of the well known ways. The yield of pure phenol is about 90% and more. An addition of metals, such as copper, nickel etc. to the catalyst, may be an advantage.

Referring to the accompanying drawing, the numeral 1 denotes a kettle which may be heated by a direct heat or by means of a steam coil (not shown). A catalyzer tube 2 is mounted on top of and communicates with kettle 1, the tube 2 containing the catalyst 3, arranged on a suitable grate 4, secured at its bottom, up to nearly its rim, the catalyst being in the form of balls or tablets. The tube 2 is connected with the condensing chamber 5 by a neck 6, in the wider part of which a thermometer tube 10 is inserted to reach deeply into the catalyst 3 so as to allow measuring its temperature within approximately the middle of its body, the temperature being ascertained either by means of an electric or mercury thermometer (not shown).

The condensing chamber 5 has an outlet 5a which terminates within and shortly below the rim of the bell 7 of a funnel 8 entering into and terminating shortly above the bottom of the kettle 1.

The condensing chamber 5 is provided with a coil or a system of tubes cooled by running water (not shown).

The catalyzer tube 2 is surrounded by an electric heating arrangement 9 suitably of cylindrical shape, the resistance wire of said arrangement being connected with the bus-bars of a source of electric energy (not shown).

The apparatus described above may be made of various materials, it should of course be a material which is not affected by an alkali metal hydroxide solution, such as sodium hydroxide solution. Furthermore, the catalyzer tube 2, the neck 6 and the condensing chamber 5, must be made of a material which is resistant to the vapors of chlor-benzol, phenol, water vapor and hydrochloric acid gas. If we use, for instance, copper, or a copper alloy, the effect of the vapors on the same is relatively small. The copper, however, particularly if the catalyzer tube 2 is made thereof, exerts a favorable effect upon the process and we may thus obtain yields of phenol ranging from 90–100%.

Instead of using the copper, or copper alloy, the catalyst 3, as described above, we may embody the catalytically acting metals, or metallic compounds, in any suitable way into the catalysts.

The operation of the process by means of the apparatus described above, is about as follows:

We fill into the kettle 1, for instance 112, 5 kilo of chlor-benzol and 950 kilo of 10% NaOH solution and heat it by direct heat, for instance a gas burner (not shown) in order to bring the mixture of chlorbenzol and sodium hydroxide solution to boiling. In the meantime, we also turn on the electric current to heat the catalyst 3 to a temperature of 500° C. so that this temperature is reached when the mixture of chlor-benzol and sodium hydroxide starts to boil. When this point is reached, the vapors of chlor-benzol and water ascend into the catalyzer tube 2 and the catalyst 3 therein causes the water vapor to act on the chlor-benzol, generating vapors of phenol and hydrochloric acid.

These vapors travel from the catalyzer tube 2 into the neck 6 and pass into the condenser chamber 5 where they are condensed, the condensate being discharged through the outlet 5a into the bell 7 of the funnel 8. The condensate consists of uncharged chlor-benzol, phenol and hydrochlorid acid and when this condensate enters through funnel 8 into the mixture of chlor-benzol and sodium hydroxide contained in kettle 1, the phenol and the hydrochloric acid are neutralized, whereas the undecomposed chlor-benzol is vaporized again; this cycle is repeated until all the chlor-benzol is all decomposed. In order to bring about a complete transformation of all the chlor-benzol charged into the kettle 1, the presence of an excess of sodium hydroxide in the kettle 1 is necessary.

The kettle 1 ultimately contains no chlor-benzol, but only an aqueous solution of phenol-sodium and sodium chloride, from which in the well known way the generated phenol may be separated, for instance by acidulating aforesaid aqueous solution, separating and extracting the phenol.

What we claim is:

1. The process for the manufacture of phenols by hydrolysis of the nuclear halogen substituted aromatic hydrocarbons, said process comprising acting at a temperature of from 350–600° C. on the vapors of said hydrocarbon halides with steam in the presence of a substance selected from a group, consisting of the oxides, hydroxides, and salts of the metals aluminum, magnesium, iron, thorium, titanium, zirconium, and tungsten, mixed with a substance selected from a group consisting of the metals, oxides, hydroxides and salts of zinc, copper, nickel, and cadmium.

2. The process for the manufacture of phenols by hydrolysis of the nuclear halogen substituted aromatic hydrocarbons, said process comprising acting at a temperature of from 350–600° C. on the vapors of chlorbenzene with steam in the presence of a substance selected from a group, consisting of the oxides, hydroxides, and salts of the metals aluminum, magnesium, iron, thorium, titanium, zirconium, and tungsten, mixed with a substance selected from a group consisting of the metals, oxides, hydroxides and salts of zinc, copper, nickel, and cadmium.

3. The process for the manufacture of carbolic acid by hydrolysis of chlorbenzene, said process comprising acting on the vapors of chlorbenzene with steam in the presence of aluminum oxide and a copper salt.

4. The process for the manufacture of carbolic acid by hydrolysis of chlorbenzene, said process comprising acting on the vapors of chlorbenzene with steam in the presence of aluminum oxide and copper phosphate.

5. The process for the manufacture of carbolic acid by hydrolysis of chlorbenzene, said process comprising acting on the vapors of chlorbenzene with steam in the presence of zinc oxide, obtained by carefully burning up metallic zinc.

6. The process for the manufacture of phenols by hydrolysis of the nuclear halogen substituted aromatic hydrocarbon, said process comprising acting at a temperature of from 350–600° C. on the vapors of said hydrocarbon halide with steam in the presence of a substance selected from a group consistsing of the oxides, hydroxides and salts of the metals aluminum, magnesium, iron, thorium, titanium, zirconium, and tungsten, mixed with zinc phosphate.

FRIEDRICH A. STEINGROEVER.
RUDOLF ZELLMANN.